No. 12,196. REISSUED FEB. 2, 1904.
J. BAXTER.
COURSE AND BEARING CORRECTING DEVICE.
APPLICATION FILED JAN. 8, 1904.
Fig. 1
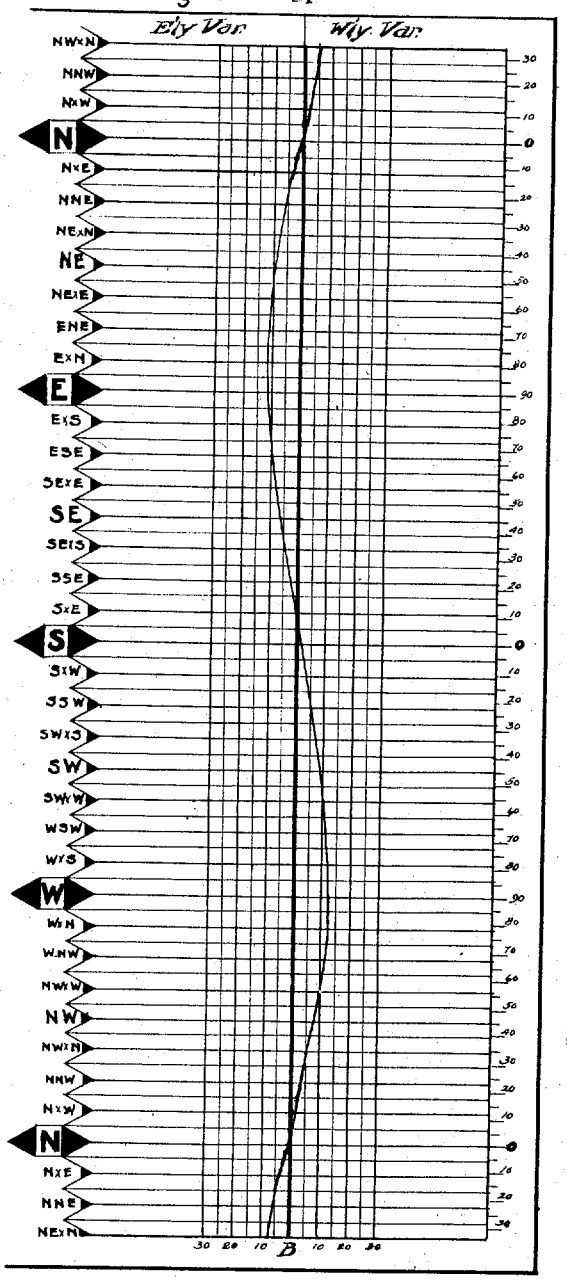
Fig. 2
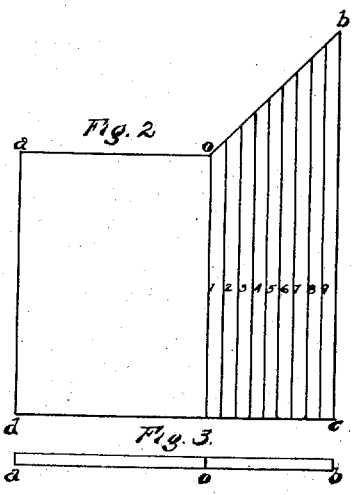
Fig. 3.
WITNESSES:
Geo. T. Davis
E. E. Dockstader.
John Baxter INVENTOR
BY
W. H. Faunt
ATTORNEY No. 12,196. Reissued February 2, 1904.

UNITED STATES PATENT OFFICE.

JOHN BAXTER, OF BUFFALO, NEW YORK.

COURSE AND BEARING CORRECTING DEVICE.

SPECIFICATION forming part of Reissued Letters Patent No. 12,196, dated February 2, 1904.

Original No. 745,314, dated December 1, 1903. Application for reissue filed January 8, 1904. Serial No. 188,265.

*To all whom it may concern:*

Be it known that I, JOHN BAXTER, residing at Buffalo, in the county of Erie and State of New York, have invented certain new and useful Improvements in Apparatus for Facilitating Nautical Calculations, of which the following is a full, clear, and exact description, such as will enable others skilled in the art to which it appertains to make and use the same, reference being had to the accompanying drawings, and to the characters of reference marked thereon, in which the same character of reference indicates the corresponding part.

My invention relates to a new and useful device and methods for changing compass, magnetic, or true courses and bearings into one of either of the others, but more specially for the use of seamen in laying down a course or bearing.

The object of the invention is to provide an easily-operated, cheap, rapid, and certain device for changing true courses or bearings into magnetic courses or bearings, true courses or bearings into compass courses or bearings, magnetic courses or bearings into true courses or bearings, magnetic courses or bearings into compass courses of bearings, compass courses or bearings into magnetic courses or bearings, compass courses or bearings into true courses or bearings, and all other like problems which at present require intricate calculations for their solution.

The particular features of my invention will be hereinafter more specifically pointed out, and described in the claims at the end of this specification.

Referring to the annexed drawings, Figure 1 is a plan of one portion of the device. Fig. 2 is a plan of the other portion of the device. Fig. 3 is an elevation of that portion the plan of which is represented by Fig. 2.

A card of convenient dimensions made of cardboard or any other suitable material has drawn or engraved on one face a series of vertical and horizontal lines. The vertical lines may be drawn such a distance apart that the space between represents one or more degrees of arc. In the drawings the heavy lines represent ten-degree divisions and the light lines five-degree divisions. The horizontal lines may be drawn, making spaces equal with those made by the vertical lines and intersecting the latter at a right angle, or they may be drawn as in Fig. 1, the heavy lines eleven degrees and fifteen minutes of arc apart and the included spaces subdivided, as in Fig. 1, into equal spaces, or. more preferably, into quarters and eighths. Each one of the divisions between the heavy horizontal lines represents one point of the compass, and these points are indicated by the letters "N," "N × E," "NNE," "NE × N," "NW × N," "NNW," "N × W," "N," on the left-hand margin of the card. For convenience the right-hand margin is marked in quadrants and each quadrant into degrees from zero to ninety to follow the markings on a compass-card. The object of these two markings is to convert the courses or bearings into compass-points or into degrees of arc.

Fig. 2 is a thin piece of metal, cardboard, or other suitable material, preferably transparent, as celluloid. A portion of the upper edge *a o* is perfectly straight. The other portion, *o b*, is inclined upward from *o* to *b* at an angle of forty-five degrees of arc. The two sides *a d* and *b c* are at right angles to the edge *a o*, and the light lines 1 2 3 4 5 6 7 8 9 are scribed on the celluloid plate parallel to the sides *a d* and *b c* and of equal spacing with the vertical lines on Fig. 1. The bottom edge *d c* is at right angles to the sides.

The deviations on all points are plotted beforehand on the horizontal lines running to the compass-points, and through them a smooth continuous curve is drawn, as is done in constructing the ordinary Napier diagram. The heavy central line A B in Fig. 1 is called the "meridian" line. The spaces to the left of this line represent easterly variation and the spaces to the right westerly variation.

To show the method of operation, the compass course of a ship will be found having given the deviation, variation, and true course. Let the true course given, north 22° 30′ east; variation, 8° easterly; deviation, 6° 30′ westerly. The deviation curve will lie to the left of the meridian line.

*To find the magnetic course from the true course.*—Place the card with the inclined edge *o b* pointing upward and to the right and the notch O on the intersection of the eighth vertical variation line to the left of the meridian line and the horizontal line north 22° 30′ east ("NNE") and where the bevel edge cuts the meridian line will give the magnetic course as read in points from the left margin or degrees from the right margin.

*To find the compass course.*—Place the card with the inclined edge *o b* to the right and downward and running through the intersection of the deviation curve and the horizontal line running from north 22° 30′ east, ("NNE.") Then move the card up and down, always keeping its vertical edges parallel to the vertical lines until the notch *o* is on the 8° easterly variation line. The horizontal edge *a o* will then point to the left and at its point of intersection with the left vertical marginal line will give the compass course in points. To convert a compass course into a magnetic course or a true course, the operation is reversed. Let the given compass course be south 45° east; variation, 3° easterly; deviation, 6° westerly.

*To find the magnetic course.*—Place the card with the notch *o* at the point of intersection of the deviation curve with the horizontal line passing through south 45° east, ("SE,") the inclined edge *o b* pointing upward and to the right. The point where this inclined edge cuts the meridian line will give the magnetic course as read in points from the left margin or in degrees from the right margin.

*To find the true course.*—Place the card with the inclined edge *o b* downward and to the left and passing through the intersection of the deviation curve and the horizontal line running through south 45° east, ("SE,") move it up or down, always keeping the vertical edges parallel to the vertical variation lines, until the notch *o* is on the 3° easterly variation line, the horizontal edge *a o* will point to the right and where it cuts the right vertical marginal line will give the true course in degrees, or following the horizontal line to the left margin this same course can be read off in compass-points.

Having described my invention, what I claim as new, and desire to secure by Letters Patent, is—

1. In a device for mechanically solving the mathematical problems of the conversion of angles, applying certain corrections to angles, or other mathematical problems of a like nature a card the face of which is provided with a series of vertical and horizontal lines the vertical lines representing certain units such as degrees of arc, the horizontal lines representing the same or different units, such as compass courses, in combination with a plate or pointer of a rigid material, so constructed that when it is placed on the card at the known angle, course, or bearing the plate or pointer will indicate the converted or corrected angle, course, or bearing.

2. In a device of the class described, the combination of a card having thereon vertical lines suitably spaced and labeled representing degrees of arc, horizontal lines suitably spaced and labeled representing compass courses and a device having a straight edge adapted to coincide with one of the before-mentioned lines and another straight edge extending at an angle to the first-mentioned edge and from the end of the same, for the purpose described.

3. In a device for converting or correcting courses or bearings or problems of a like nature a card the face of which is provided with a series of vertical and horizontal lines the vertical lines representing degrees of arc, the horizontal lines representing compass courses or bearings either in degress of arc or compass-points, as commonly marked on the mariner's compass, in combination with a plate or pointer of transparent material so constructed that when it is placed on the card at the known course or bearing the corrected course or bearing will be indicated.

4. In a device for correcting courses or bearings a card of any suitable material the face of which is provided with a series of equally-spaced vertical lines and equally-spaced horizontal lines the central vertical line, called the "meridian line," representing the development of the outer edge of a mariner's-compass card marked in degress of arc the equally-spaced vertical lines on either side representing degrees of arc for the correction of the error due to variation, the horizontal lines representing compass courses or bearings for the correction of the error due to deviations and designated near the left-hand margin of the card by the compass-points and fractions of points as commonly used on a mariner's compass and near the right-hand margin by degrees of arc in multiples of ten, in combination with a pointer or plate of transparent material the face of which is provided with a series of vertical lines scribed on its surface the vertical lines being of equal spacing with the vertical lines on the card, so constructed that the two sides and bottom form three sides of a rectangle with a portion of the fourth side parallel to its opposite side and the remainder inclined at an angle of forty-five degrees to the right of the perpendicular thereby forming a forty-five-degree point with the right side of the plate or pointer and when placed on the card compass courses or bearings, magnetic courses or bearings or true courses or bearings or other problems of a like nature may be changed into one or more of the others.

In testimony whereof I affix my signature in the presence of two witnesses.

JOHN BAXTER.

Witnesses:

PERRY GARSH,
TOM JONES.